(12) United States Patent
Schmidt et al.

(10) Patent No.: US 6,894,510 B2
(45) Date of Patent: May 17, 2005

(54) LOCATING DEVICE

(75) Inventors: Ewald Schmidt, Ludwigsburg (DE); Heinz Pfizenmaier, Murrhardt (DE); Steffen Leutz, Mauer (DE); Hans Irion, Winnenden (DE); Juergen Hasch, Uhingen (DE); Stefan Clauss, Leinfelden-Echterdingen (DE); Uwe Skultety-Betz, Leinfelden-Echterdingen (DE); Bjoern Haase, Stuttgart (DE); Ulli Hoffmann, Nieffern-Oeschelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/240,352

(22) PCT Filed: Feb. 4, 2002

(86) PCT No.: PCT/DE02/00396

§ 371 (c)(1),
(2), (4) Date: Jan. 29, 2003

(87) PCT Pub. No.: WO02/063343

PCT Pub. Date: Aug. 15, 2002

(65) Prior Publication Data

US 2004/0095151 A1 May 20, 2004

(30) Foreign Application Priority Data

Feb. 3, 2001 (DE) .......................... 101 04 865

(51) Int. Cl.⁷ .......................... G01R 27/26; G01R 19/00
(52) U.S. Cl. .......................... 324/690; 324/67; 324/688
(58) Field of Search .......................... 324/686, 688, 324/690, 663, 664, 671, 627, 67; 340/870.37; 901/46

(56) References Cited

U.S. PATENT DOCUMENTS

| | | | | |
|---|---|---|---|---|
| 3,805,150 A | * | 4/1974 | Abbe ........................ 324/662 |
| 4,016,490 A | * | 4/1977 | Weckenmann et al. ..... 324/671 |
| 4,072,896 A | * | 2/1978 | Bijimer ..................... 324/109 |
| 4,099,118 A | * | 7/1978 | Franklin et al. ............ 324/671 |
| 4,853,617 A | * | 8/1989 | Douglas et al. ............... 324/67 |
| 4,859,931 A | | 8/1989 | Yamashita .................... 324/67 |
| 5,726,581 A | | 3/1998 | Vranish ...................... 324/688 |

OTHER PUBLICATIONS

Patent Abstracts of Japan vol. 1995, No. 3, Apr. 28, 1995 & JP 06 349392 A, Dec. 22, 1994.

* cited by examiner

*Primary Examiner*—Anjan K. Deb
(74) *Attorney, Agent, or Firm*—Michael J. Striker

(57) ABSTRACT

The invention relates to a locator, in particular a handheld locator for detecting inclusions in walls, ceilings and/or floors, having a capacitive sensor device disposed in a housing, having means for generating a detection sensor of the at least one capacitive sensor device, having a control and evaluation unit, communicating with the sensor device, for ascertaining measurement values from the detection sensor, and having an output unit for reproducing measurement values of the capacitive sensor device.

According to the invention, it is proposed that a measuring capacitor (16) of the capacitive sensor device (10) has a first electrode (21), which includes one face of the housing (14) of the sensor device (10).

21 Claims, 2 Drawing Sheets

Fig. 2
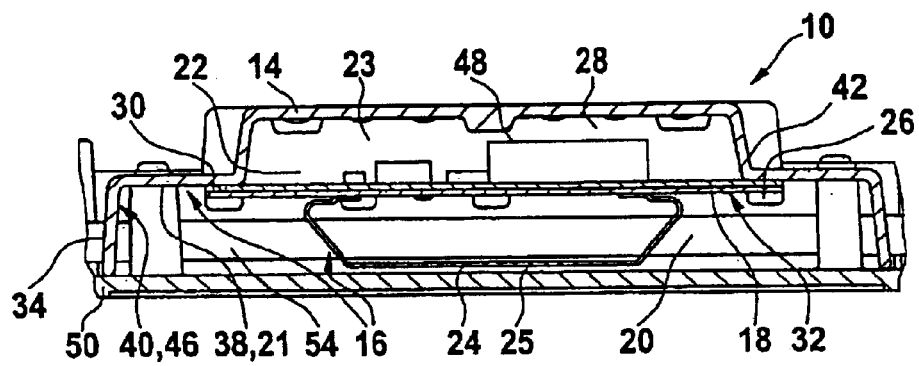
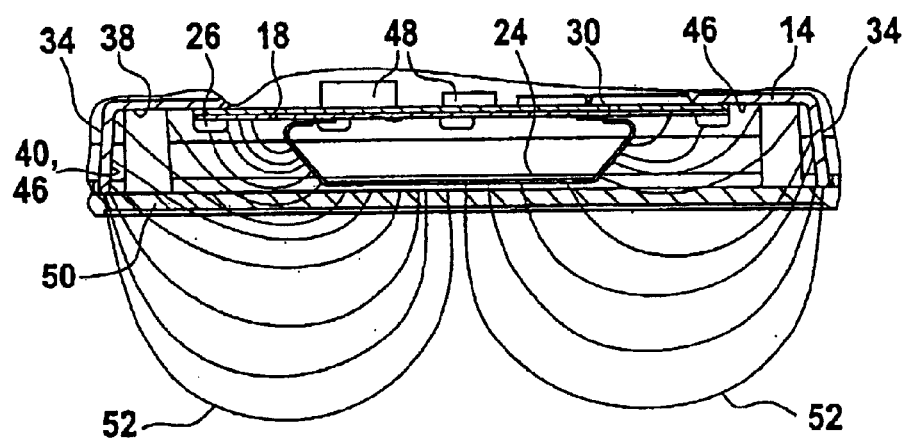
Fig. 3

LOCATING DEVICE

BACKGROUND OF THE INVENTION

The invention relates to a locator, in particular a handheld locator, for detecting inclusions in walls, ceilings and/or floors with the aid of a capacitive sensor device that makes it possible to detect differences in impedance of a measurement signal and draw conclusions about the hidden objects that generate the differences in impedance.

For locating inclusions in wall material, essentially two different measuring methods are used at present. The inductive methods, which are the basis for a first family of locators, utilize the fact that introducing metal objects into magnetic alternating fields affects the course of the magnetic field lines. This influence of the metal objects is expressed for instance in the amount of the impedance of a coil that generates a magnetic alternating field of this kind. Inductive methods are especially well suited for detecting ferromagnetic materials. However, the search for nonmagnetic materials, such as copper or plastic, presents difficulties. Plastic lines, especially, which are increasingly used in the field of installation work, cannot in principle be found by this method.

The three-dimensional sensitivity of a sensor that functions inductively is directly associated with the three-dimensional distribution of the magnetic fields generated by the measuring coils. It is decisive in designing a sensor to take a directional characteristic into account. When the locator is placed on an object to be investigated, such as wall material, the sensor should as much as possible detect only hidden objects inside the wall, and thus the locator should respond only to objects that are located in front of the transmitter. Objects behind and next to the sensor must not alter the outcome of measurement.

In sensors that function inductively, this problem is typically solved by using ferrite bodies onto which the coils of the sensor of the locator are wound. These ferrite bodies have the property of focusing the electromagnetic field generated by the coils and thus of guiding it in a certain way. Focusing the field can be expressed for instance in the course of the field lines and can also be detected. The parameter that is decisive for focusing the field lines and thus for generating the directional characteristic of such a sensor is the amount of magnetic susceptibility of the core material (ferrite body). With ferromagnetic materials, magnetic susceptibility values on the order of magnitude of 100 are technically not a problem and can be attained economically. If a suitable core geometry is selected, the desired directional characteristic can therefore be attained by simple means and at low cost, for inductive locating methods.

A second class of location sensors or locators utilizes capacitive methods for detecting enclosed objects. Such capacitive methods are currently used in the building trade to search for instance for substructures, studs, and comparable wall inclusions in lightweight buildings. The key element of a capacitive sensor or locator of this kind is a capacitor element. The measurement principle fundamental to this method is based on the variation in the impedance of the measuring capacitor by the dielectric medium surrounding it. The presence of an object with a deviant dielectric constant in the surroundings of the measurement sensor results in a variation in the capacitance of the sensor element and thus in an electrically measurable effect.

Unlike inductive locators, in capacitive sensors it is markedly more difficult to achieve a directional characteristic. Although here as well, analogous to the methods in inductive sensors described above, it is conceivable in principle to use materials that focus the electrical field, nevertheless at feasible costs for such a detection system to be used commercially, it is realistically possible to use only such materials as have low values of the dielectric constant $\in$ and thus a low capability of focusing the electrical field, or of focusing the electric field lines described by the electrical field. Typical values of the dielectric constant E for usable materials are on the order of magnitude of 5, so that an adequate directional characteristic requires the use of more-complicated and thus more-cost-intensive focusing mechanisms and shielding geometries.

From U.S. Pat. No. 5,726,581, a capacitive proximity sensor is known, in which the current through a sensor element is increased by the presence of an object, so that this increase in current can be detected from the altered voltage drop at a resistor. To generate a certain directional characteristic for the measurement field, an additional shielding electrode is applied to the side of the sensor electrode remote from the object. Both electrodes are connected to a common ground potential.

The change in capacitance of the sensor electrode that is due to the object is maximized by providing that the capacitance between the sensor element and ground is minimized. This is attained by providing that the electrical field lines originating at the measuring electrode are deformed, over a wide three-dimensional range, by the larger shielding electrode in such a way that a direct connection with the ground potential is not possible. In this way, a certain directional effect of the electrical field of the measuring electrode is also generated.

A further problem in constructing capacitive sensors is undesired crosstalk between the conductor faces of the measuring capacitor on one side and the electronic components of the evaluation circuit on the other. If even small objects are to be detected, even the slightest signals must be filtered out of the background noise in the measurement signal. Crosstalk of the electrical fields of the measurement signal, for instance to the electronic components of the evaluation device of a locator of this kind, can alter the measurement outcomes and thus can make precision measurements impossible. For this reason, these two component parts, that is, the actual capacitive sensor element and the electronic evaluation circuits of the capacitive locator, are often disposed spatially separately from one another and are connected to one another by cables.

It is the object of the invention to disclose a capacitive locator of the type defined at the outset that has a compact structure, low cost, and easy technical feasibility along with adequate directional precision. It is also the object of the invention, in a locator of the type described at the outset, to realize parasitic crosstalk phenomena between the capacitive sensor device and electronic components for generating and evaluating the measurement signal of such a device, by means that are as simple as possible from a production standpoint yet are mechanically stable.

SUMMARY OF THE INVENTION

The locator of the invention for detecting inclusions in walls, ceilings and/or floors uses a capacitive sensor in the form of a capacitor, whose first electrode includes a housing face of the sensor device. Because of the design according to the invention of the capacitive sensor, it is possible to realize a directional characteristic for the sensor without having to integrate complicated additional components into the housing of the sensor device for the sake of shielding the electrical field of the capacitor.

According to the invention, the capacitive sensor device has a housing which on the one hand is intended to provide the mechanical protection of the sensor device but on the other is simultaneously intended to be part of a first electrode of a capacitor of the capacitive sensor device. With the aid of this housing, a defined directional characteristic of the capacitive sensor device of the locator can then be made possible in a simple, advantageous way.

The actual sensor device with its housing can then be integrated with a locator housing that is permeable to the electrical field of the sensor, which has various operator control elements and also has an output device for measurement values, for instance in the form of a display.

By means of the characteristics recited in the other claims, advantageous refinements of an improvements to the locator defined by claim 1 are possible.

In one advantageous feature of the locator of the invention, the second electrode of the measuring capacitor of the sensor device is mechanically connected to a printed circuit board of the sensor device. The printed circuit board itself is in turn connected to the housing of the sensor device. In this way, a mechanically stable construction for the measuring capacitor and simultaneous electrical separation of the two capacitor electrodes can be achieved, since by definition the electronic components for generating a detection sensor already have a printed circuit board or the like.

Advantageously, the printed circuit board can be joined mechanically to a housing face, such as a shoulder of the housing of the sensor device, by being screwed or riveted, welded, or soldered to the housing. Other joining techniques known to one skilled in the art are also possible.

Advantageously, the electronic components, for instance for generating a detection sensor for the capacitive sensor device, can also be mounted on this printed circuit board. It is especially advantageous for these electronic components to be mounted on the second side of the printed circuit board, that is, the side remote from the second electrode of the measuring capacitor. In this way, shielding of the electronic components for generating and evaluating the detection sensor from the electrical field of the second electrode of the measuring capacitor is possible by simple means.

To improve the shielding, the printed circuit board can be provided with a metal layer. It is especially advantageous if such a printed circuit board together with the housing of the capacitive sensor device forms an enclosed chamber, in which the electronic components are disposed.

The electrically conductive layer in or on the printed circuit board, together with a housing face of the sensor device of the locator, thus creates a Faraday cage, so that the chamber in which the electronic components are disposed are effectively shielded against electromagnetic radiation. This is especially necessary for precision measurements with the locator of the invention, since they require good shielding of the electronic components that are required for generating and evaluating the measurement signal.

Because of the design according to the invention of the housing faces of the sensor device, in conjunction with an advantageous disposition of the printed circuit board that carries both the electronic components and an electrode of the measuring capacitor, the problem of undesired crosstalk of electrical signals can thus be solved without additional effort or expense, or in other words without additional components, and so the proposed locator can be attained with a very compact design and can be used in versatile ways in the form of a lightweight handheld locator.

The housing of the sensor device of the locator of the invention is advantageously designed such that it three-dimensionally embraces the second electrode of the measuring capacitor in such a way that the field applied between the capacitor electrodes is given a pronounced directional characteristic.

To that end, the housing of the sensor device is for instance shaped from a metal, or is drawn from a metallized plastic. An electrically conductive coating of the housing of the sensor device can also be advantageously used for orienting the electrical field of the measuring capacitor.

Since the housing according to the invention of the sensor device serves not only to provide mechanical stability and electromagnetic shielding of the electronic components of the sensor device but simultaneously also forms one electrode of the sensor capacitor, it is possible for the housing according to the invention to be shaped in such a way that the electrical field created between the electrodes of the sensor capacitor is given a directional characteristic. This can advantageously be realized for instance by providing that the housing of the sensor device is open on one side and laterally embraces the second electrode of the capacitor.

The first electrode of the measuring capacitor of the capacitive sensor device can advantageously also be realized in such a way that this electrode is formed by one face of the housing of the capacitive sensor device and by an electrically conductive surface of the printed circuit board. This makes a further advantageous shaping of the electrical field of the measuring capacitor possible.

In particular, in this way, by simple mechanical means, a directional characteristic of the capacitive sensor can be realized that causes a strong measurement signal to penetrate the medium to be investigated underneath the sensor. The development of stray fields in directions that are not in the preferential direction of this directional characteristic can be effectively suppressed in this way, so that an intensive measurement signal without major stray fields can be used.

The capacitive sensor device with its housing open on one side is built into a housing of the locator that is transparent to the electrical measuring field of the sensor, so that the electrical measuring field can penetrate the measurement object to be investigated (wall, floor, or the like).

The housing of the locator therefore comprises a plastic, for instance, that also covers the opening of the housing of the sensor device, so that the sensor device is mechanically protected. The housing of the locator also receives the other operator control elements and also for instance a display for reproducing the outcomes of measurement. The housing of the locator is advantageous constructed in such a way that a compact, relatively lightweight and thus handheld measuring instrument is obtained.

BRIEF DESCRIPTION OF THE DRAWINGS

In the drawing, one exemplary embodiment of a capacitive sensor device of a locator of the invention is shown, which will be explained in further detail in the ensuing description. The drawing figures, their description, and the claims directed to the locator of the invention include numerous characteristics in combination. One skilled in the art will also consider these characteristics individually and put them together to make other appropriate combinations.

Shown are:

FIG. 2, a section through the housing of the sensor device of the invention, shown schematically;

FIG. 3, a view of the housing of the locator of the invention, shown schematically as in FIG. 2, in which a distribution of the electrical field lines of the sensor capacitor are drawn schematically, to illustrate a directional characteristic.

DETAILED DESCRIPTION OF THE PREFERRED EMBODIMENTS

Figure 1:
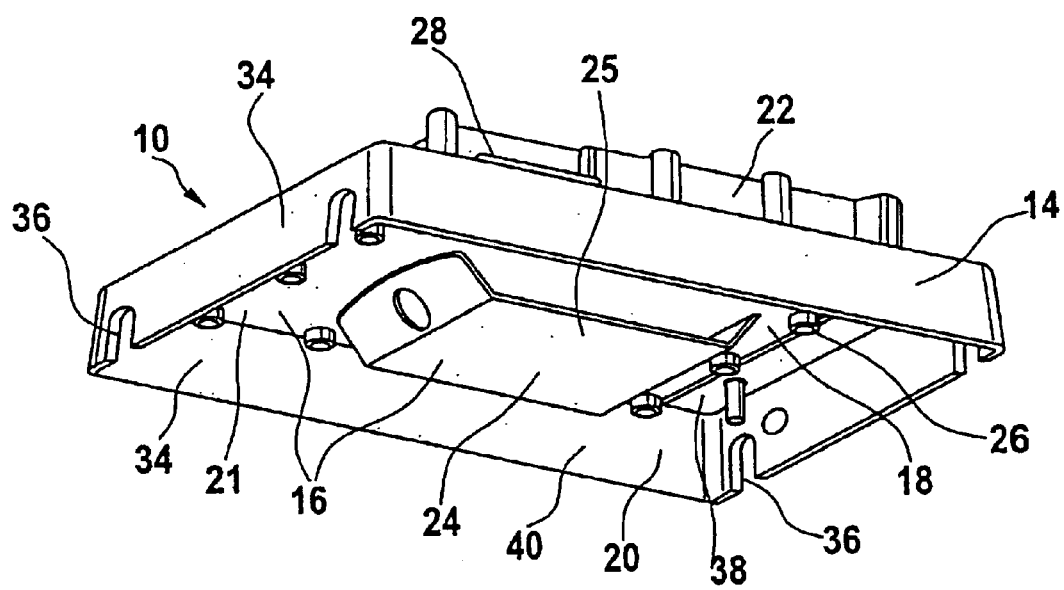
FIG. 1, a perspective view of the housing of the sensor device of the locator of the invention.

FIG. 1 shows the fundamental construction of the sensor device 10 of the locator 12 of the invention. The sensor device 10 has a housing 14 with a conductive surface. The housing 14 can be made for instance from a metal in the form of a one-piece die-cast part, or of metallized plastic by means of a shaping. Metallically conductive coatings are also possible for the housing 14 of the sensor device.

The housing 14 is open on one side, in the direction of an object to be measured, and includes essential components of the sensor device 10 and is itself an integral component part of this sensor device 10. The sensor device 10 has essentially two groups of components. One group of components is electrical circuits for processing the measurement signals. The second component group of the sensor device includes the actual capacitive sensor, which in the locator of the invention is realized by means of an especially designed measuring capacitor 16.

The two different component groups mentioned are disposed in two partial chambers 20 and 22 of the housing 14 that are separated from one another. The partial chambers 20 and 22 are separated from one another by a printed circuit board 18, forming a first, open partial chamber 20 and a second, closed partial chamber 22. The printed circuit board 18 is fixed in the housing 14 at its edges to the housing 14. To that end, in the exemplary embodiment of FIGS. 1–3, the housing has a characteristic shoulder 42, upon which the printed circuit board is placed and screwed to the housing. The housing 14 is shaped in such a way, and installed in a housing, not further shown, of the locator, in such a way that the two chambers 20 and 22 are disposed one above the other.

The electronic components for generating and evaluating the measurement signal are disposed in the second, closed partial chamber 22 of the housing 14 of the sensor device 10. The second partial chamber 22 is formed by a bulge 28 in the housing 14 and by the printed circuit board 18 that is solidly joined to the housing. A metal layer 30 is advantageously integrated on or in the printed circuit board 18, so that the partial chamber 22 of the housing 14 is enclosed by an electrically conductive surface. In this way, the partial chamber 22 forms a Faraday cage (23), which makes it possible for the electronic components disposed in the partial chamber 22 to be insulated against electromagnetic interference.

As can be seen from FIG. 2, the printed circuit board 18, on one side, has electric circuits 48 for generating and evaluating the measurement signal, and an electrode 24 of the measuring capacitor 16 is secured to the other side. The printed circuit board 18 in turn is fixed to the housing 14, for instance by means of screws 26. Assembling the sensor device 10 of the locator 12 of the invention therefore requires merely introducing the printed circuit board 18, on which the electric circuits and an electrode 24 of the measuring capacitor 16 have already been applied in a preassembly process, into the housing 14. This advantageously leads to a simplification in terms of production technology, as well as economy of material, since the electric circuits and the capacitor arrangement are placed in a common housing. Separate housing arrangements for the electric circuits and for the measuring capacitor are unnecessary, in the locator of the invention.

The first partial chamber 20 of the housing 14 of the sensor device 10 is essentially formed by the surface 32 of the printed circuit board 18 and by side walls 34 of the housing 14. Recesses 36 are integrated into the side walls 34 and make it possible to anchor the housing 14 and thus also the sensor device 10 in the housing of the locator.

The first partial chamber 20 of the housing 14 is open on one side by means of an opening 54 and essentially holds the measuring capacitor 16 of the sensor device 10 of the locator 12 of the invention. The measuring capacitor 16 is formed by the inside face 38 of the partial chamber 20 of the housing 14, which face forms a first electrode 21 of the measuring capacitor, and by the second electrode 24 secured to the printed circuit board 18. In this way, it is possible to realize the measuring capacitor 16 by means of merely one additional electrode 24. The first electrode 21 of the measuring capacitor 16 is advantageously realized by the housing 14 itself. Also for this reason, the housing 14 has a conductive surface 40, which is realized for instance by providing that the housing 14 of the sensor device 10 is shaped in one piece from a metal part.

FIG. 2 schematically shows a cross section through the sensor device 10 of the locator of the Invention. The housing 14 has a pronounced shoulder 42, on which the printed circuit board 18 is secured. A metallized layer 30 is integrated with the printed circuit board 18 and is in conductive contact with the electrically conductive surface 46 of the housing 14 of the sensor device 10. The electrical connection between the metallized layer 44 of the printed circuit board 18 and the housing 14 can be created for instance by means of the screws 26 for mechanically fixing the printed circuit board to the housing.

On the side of the printed circuit board 18 remote from the electrode 24, various electronic components 48 are disposed, which serve to generate signals and in the present exemplary embodiment of FIG. 2 also serve to evaluate the measurement signal. The partial chamber 22, which is formed by the bulge 28 in the housing 14 and by the printed circuit board 18, is surrounded in a closed way by an electrically conductive surface, so that this partial chamber 22 forms a Faraday cage 23, which makes it possible for the electronic components 48 disposed in the partial chamber 22 to be shielded against electromagnetic radiation.

On the side of the printed circuit board 18 remote from the partial chamber 22, the second electrode 24 of the measuring capacitor 16 is mechanically connected to the printed circuit board 18. The first electrode 21 of the measuring capacitor 16 of the sensor device 10 of the locator is formed, in this exemplary embodiment, by the conductive surface 46 of the interior of the first partial chamber 20 of the housing 14. The first partial chamber 20 can, as shown in the exemplary embodiment of FIG. 2, be closed by a wall 50, as long as this wall presents no hindrance to the electrical field of the measuring capacitor 16.

For this reason, the wall 50 can be embodied for instance by one side of a plastic housing of the locator of the invention. In that case, the locator of the invention would be passed with the housing wall 50 over the structure to be surveyed, such as a ceiling or a floor. The wall 50 serves to mechanically protect the electrode 24 of the measuring capacitor 16 and also any components 48 that may be disposed in the partial chamber 20 of the sensor device 10.

In a simple way, the electrode 24 of the measuring capacitor 16 can be shaped for instance as a stamped and bent part. The electrode 24 advantageously has one face 25 disposed parallel to the printed circuit board 18. The housing 14 can be in one piece as a die-cast metal part, or can be drawn from a metallized plastic.

FIG. 3 shows a cross section through the sensor device 10 of the locator 12 of the invention, in which the course of the field lines of the measuring capacitor upon operation of the locator are drawn in for the sake of illustration. The electrodes of the measuring capacitor are formed on the one hand by the electrode 24, which is secured to the printed circuit board 18, and on the other by the conductive inner surface 46 of the housing 14 in the region of the partial chamber 20.

By means of the embodiment of the housing 14 according to the invention, a desired directional characteristic of the electrical field 52 of the measuring capacitor can be achieved. This is achieved for instance by providing that the side walls 34 of the housing 14 of the sensor device 10 laterally embrace the printed circuit board 18, and thus the electrode 24 mounted thereon. Thus by the shape of the partial chamber 20, the directional characteristic of the electrical fields 52, which serves to detect the objects enclosed for instance in a wall, can be oriented in a desired way. The shape of the housing 14 is indicated only schematically in FIGS. 1, 2 and 3, so that the fundamental principle is clearly shown. Advantageously, still other housing shapes for the sensor device 10 with which the electrical field of a measuring capacitor 16 of such a sensor device can be optimized can be achieved.

For instance, as indicated in FIG. 3, the first capacitor electrode can also be formed by the conductive surface 46 of the interior of the first partial chamber 20 and by a conductive layer on the surface of the printed circuit board 18.

The electrical field 52 emerges in oriented form from the housing 14 of the sensor device 10, and thus also from the housing of the locator, and penetrates a wall, for instance, that is to be surveyed, when the locator is placed with its housing wall 50 against the wall.

The sensor device 10 described in FIGS. 1–3 is integrated with a housing, not otherwise shown, of the locator. This housing of the locator has not only the sensor device 10 but at least also a display element, such as a display, on which location information about an object detected with the locator in a wall, ceiling or floor can be shown. On such a display, for instance, the precise location of an enclosed object can be displayed relative to the position of the locator. The display unit will not be described further here, because it is not the subject of the invention. The housing of the locator of the invention furthermore has switching means, for initiating appropriate measurement operations using the device.

It is equally possible for an interface to be integrated with the housing of the locator, for transmitting measurement data to a further device, such as a computer, or a second graphic display.

The locator of the invention is not limited to the embodiment shown in FIGS. 1–3.

In particular, the locator of the invention is not limited to the housing shape shown in the drawings. Advantageous refinements of the shape of the housing 14 of the sensor device 10 of the locator are possible.

The locator of the invention, with its sensor device 10, is not limited to finding dielectric inclusions in wall materials, such as metal objects or plastic lines, but instead can also be used in all other applications in which a directional survey of the dielectric constant of a medium is desired. In this connection, reference may be made for instance to measuring the moisture content of walls.

The locator of the invention is not limited to detecting inclusions in walls, ceilings and/or floors, but instead can be used generally for detecting and demonstrating enclosed objects that are not visible to the human eye.

What is claimed is:

1. A locator in the form of a handheld locator for detecting inclusions in walls, ceilings and/or floors, comprising:
   at least one capacitive sensor device disposed in a housing;
   means for generating a detection sensor of the at least one capacitive sensor device;
   a control and evaluation unit, communicating with the sensor device, for ascertaining measurement values from the detection sensor; and
   an output unit for reproducing measurement values of the capacitive sensor device, wherein a measuring capacitor (16) of the capacitive sensor device (10) has a first electrode (21), wherein at least one surface of the housing (14) is an integral component of the first electrode (21) of the measuring capacitor (16) of the capacitive sensor device (10).

2. The locator of claim 1, wherein the housing (14) of the sensor device (10) has a chamber (20) in the form of a hollow chamber, for receiving a second capacitor electrode (24) of the measuring capacitor (16).

3. The locator of claim 1, wherein a second capacitor electrode (24) of the at least one measuring capacitor (16) of the capacitive sensor device (10) is mounted on a printed circuit board (18), wherein the printed circuit board is mechanically connected to the housing (14) of the capacitive sensor device (10).

4. The locator of claim 3, wherein the second electrode (24) of the measuring capacitor (16) has a face (25), wherein said face (25) extends essentially parallel to the printed circuit board (18).

5. The locator of claim 3, wherein the printed circuit board (18) is disposed in the housing (14) of the sensor device (10) in such a way that a second, essentially closed chamber (22) is formed by the printed circuit board (18) and the housing (14) of the sensor device (10).

6. The locator of claim 5, wherein electronic components (48) are disposed in the second, essentially closed chamber (22) of the housing (14) of the sensor device (10).

7. The locator of claim 6, wherein the electronic components (48) are disposed on the side of the printed circuit board (18) remote from the second electrode (24) of the measuring capacitor (16).

8. The locator of claim 3, wherein the housing (14) of the sensor device (10) has a shoulder (42), wherein the printed circuit board (18) is placed and secured on the shoulder (42).

9. The locator of claim 5, wherein the second, essentially closed chamber (22) of the housing (14) forms a Faraday cage (23) for the components (48) disposed therein.

10. The locator of claim 9, wherein the Faraday cage (23) enclosed electronic components (48) for the generating and/or evaluating a detection sensor of the capacitive sensor device (10).

11. The locator of claim 3, wherein the printed circuit board (18) has at least one metal layer (30), wherein said at least one metal layer shields the second electrode (24) of the measuring capacitor (16) of the capacitive sensor device (10).

12. The locator of claim 3, wherein the housing (14) of the capacitive sensor device (10) has an opening (54), on a side of the second electrode (24) of the measuring capacitor (16) remote from the printed circuit board.

13. The locator of claim 12, wherein the opening (54) in the housing (14) of the capacitive sensor device (10) is covered by a housing part (50) of a housing of the locator (12), wherein said housing part is transparent to the electrical field (52) of the measuring capacitor (16).

14. The locator of claim 1, wherein the first electrode (21) of the measuring capacitor (16) of the capacitive sensor device (10) is formed by one face of the housing of the capacitive sensor device (10) and by an electrically conductive surface (30) of the printed circuit board (18).

15. The locator of claim 1, wherein the housing (14) of the capacitive sensor device (10) is of metal.

16. The locator of claim 1, wherein the housing (14) of the capacitive sensor device (10) is of metallized plastic or has a metallically conductive coating.

17. The locator of claim 1, wherein the housing (14) of the capacitive sensor device (10) is shaped in one piece.

18. The locator of claim 1, wherein the housing (14) of the capacitive sensor device (10) at least partly embraces the second electrode (24) of the measuring capacitor (16).

19. The locator of claim 18, wherein the housing of the capacitive sensor device three-dimensionally embraces the second electrode (24) of the measuring capacitor (16) in such a way that an electrical field (52) applied between the measuring capacitor electrodes (21, 24) has a pronounced directional characteristic.

20. The locator of claim 14, wherein the directional characteristic of the measuring capacitor (16) is so pronounced an electrical field (52) applied between the measuring capacitor electrodes (21, 24) extends through the opening (54) in the housing (14) of the capacitor sensor device (10) end through the housing (50) of the locator (12) to penetrate a medium on the side, remote from the measuring capacitor (16), of the housing part (50) of the housing of the locator (12), wherein said housing part is transparent to the electrical field (62) of the measuring capacitor (16).

21. The locator of claim 18, wherein the housing (14) of the capacitive sensor device (10) three-dimensionally embraces the second electrode (24) of the measuring capacitor (16) in such a way that the development of stray fields in directions that are not equivalent to the preferential direction of the directional characteristic is strongly suppressed.

* * * * *